United States Patent [19]
Gloudeman et al.

[11] Patent Number: 6,141,595
[45] Date of Patent: Oct. 31, 2000

[54] COMMON OBJECT ARCHITECTURE SUPPORTING APPLICATION-CENTRIC BUILDING AUTOMATION SYSTEMS

[75] Inventors: Jeffrey J. Gloudeman, Franklin; Donald A. Gottschalk; C. Richard Kraemer, both of Waukesha; David E. Rasmussen, Dousman, all of Wis.

[73] Assignee: Johnson Controls Technology Company, Plymouth, Mich.

[21] Appl. No.: 09/054,688

[22] Filed: Apr. 3, 1998

[51] Int. Cl.$^7$ ...................................................... G06F 9/46
[52] U.S. Cl. .............................................. 700/83; 709/302
[58] Field of Search .............................. 700/83, 90, 275, 700/276, 279; 709/302

[56] References Cited

U.S. PATENT DOCUMENTS

| | | | |
|---|---|---|---|
| 5,086,385 | 2/1992 | Launey | 700/83 |
| 5,408,217 | 4/1995 | Sanderford | 340/506 |
| 5,550,563 | 8/1996 | Matneny | 345/168 |
| 5,574,653 | 11/1996 | Coomer | 702/1 |
| 5,598,566 | 1/1997 | Pascucci | 713/300 |
| 5,801,942 | 9/1998 | Nixon | 700/83 |
| 5,809,235 | 9/1998 | Sharma | 709/230 |
| 5,959,625 | 9/1999 | Betrisey | 345/339 |
| 6,028,998 | 2/2000 | Gloudeman | 709/302 |

*Primary Examiner*—Thomas C. Lee
*Assistant Examiner*—Nitner Patel
*Attorney, Agent, or Firm*—Quarles & Brady LLP; George E. Haas

[57] ABSTRACT

An object-oriented building automation system architecture allows complex building automation applications to be developed and deployed as distributed objects across a network. Applications are distributed in the form of objects that may in turn be made up of other application objects, assembly objects and standard objects. All objects are inherited from a superclass that defines a command component and a view component. The command component identifies those methods within the object that may be executed by other objects, and ultimately by the user through the user interface. The view component identifies the attributes or data stored in the object that may be displayed on the user interface. The view component encapsulates the information needed to display the object's data, so that the user interface can be a generic browser. The standard objects encapsulate physically-constrained properties or human comfort-constrained properties. Applications constructed from these objects can be revised and enhanced more easily because the embedded knowledge is preserved through encapsulation.

3 Claims, 3 Drawing Sheets

COMMON OBJECT ARCHITECTURE SUPPORTING APPLICATION-CENTRIC BUILDING AUTOMATION SYSTEMS

BACKGROUND AND SUMMARY OF THE INVENTION

The present invention relates generally to computer network systems for building automation. More particularly, the invention relates to an object-oriented software architecture that is specially designed for supporting building automation applications using an application-centric model.

Building automation systems are becoming increasingly sophisticated. Building owners and building managers want the convenience of being able to operate and maintain a variety of different devices and systems from generic computer work stations or personal computers attached to a network that integrates all of the different systems. For example, a typical building automation environment might include such diverse systems as heating and cooling (HVAC), electronic entry systems, burglar alarm systems, sprinkler systems, lighting systems, and the like. Integrating all of these different systems under a single computer network has heretofore proven to be quite challenging; in part, because the individual components and subsystems were not originally designed to work with one another.

Complicating matters further, building owners and building managers also want systems that take advantage of the latest innovations in energy management, systems diagnostics, building operation report generation and ease of use. For example, utility companies now supply large customers with real-time pricing information that may be used in a properly integrated system to lower utility costs by shifting non-essential energy consuming devices to off-peak hours. Building owners and building managers who currently cannot take advantage of real-time pricing will want to add that capability to their system. Demand for new features such as this provides a continual pressure for building automation software to change.

From the system integrator's standpoint, providing building owners and building managers with the new features and capabilities has heretofore been difficult. The difficulty stems in part from the fact that traditional building automation systems are designed from a device-centric or controller-centric viewpoint. From this conventional viewpoint building automation systems are built, from the ground up, according to the specifications and requirements of the hardware systems and controllers (processors) that make up the system. Unfortunately, this device-centric approach ties the software system architecture to a particular hardware platform, making it very difficult to develop new software as new hardware platforms evolve.

Also, the device-centric approach makes it very difficult to quickly develop new application programs to meet the demands of increasingly more sophisticated building owners and building managers. To develop a new application program, such as an application program that will advantageously exploit real-time pricing, the system integrator or system developer traditionally would need to develop an entirely new system, from the ground up, specifically incorporating all of the hardware dependencies, as needed, to implement the desired new functionality.

The present invention addresses these problems by providing a common object architecture that supports an application-centric approach. The common object architecture virtually eliminates the prior need to incorporate hardware dependencies into the system design. This results in a far more flexible system with significantly greater application longevity. The common object architecture of the invention encapsulates system properties that are less likely to change, such as properties dictated by the laws of physics or by human comfort considerations, into standard objects that more complex applications are assembled from. For example, the system can assume that a temperature below a predetermined threshold (e.g., colder than the lowest recorded temperature in Antarctica) is not a naturally occurring phenomenon and may therefore be attributed to a system or sensor failure. A connection object serves as the glue that binds these standard objects together by integrating message passing among the standard objects in a way that allows both asynchronous and synchronous processes to coexist.

In addition to encapsulating physically static parameters, such as minimum temperatures, the common object model also virtually eliminates the need to custom design new user interfaces when new applications are developed. The standard objects are derived from a superclass that defines a commands component and a views component. All standard objects inherit from the superclass and thereby include these commands and views components. The commands component encapsulates information about what methods may be performed by the particular standard object. The views component similarly identifies what attributes or data the particular object is able to supply to another object or to the user interface. In effect, all standard objects are able to convey information about (a) what methods they can perform and (b) what information they can provide. Thus the standard objects are, themselves, responsible for knowing how its attributes (data) are stored and how those attributes can be displayed and externally manipulated.

For example, a temperature sensor object based on a standard object would be capable of conveying its usable precision and range to the user interface. This allows the user interface to be implemented as a generic browser or window in which all user-actuable commands may be based on the methods identified by the standard objects' commands components and in which the information displayed in the window is identified and formatted according to the information in the respective views components.

For a more complete understanding of the invention, its objects and advantages, reference may be had to the following specification and to the accompanying drawings.

DESCRIPTION OF THE PREFERRED EMBODIMENT

The present invention provides a software system architecture that allows software engineers to more readily build modular, portable building automation applications. The software system of the invention is based on a distributed application component model that includes object-oriented constructs for performing a range of services used to construct more complex building automation applications.

These services are performed by independent and initially decoupled objects that the application engineer may assemble in numerous ways to build complex building automation applications.

Aside from the flexibility and portability achieved by the object-oriented approach, the system architecture saves the engineer considerable time, by allowing new modules to be constructed without the need to re-compile the entire system. This greatly shortens the development time and simplifies the debugging process. Also, due to the top-to-bottom consistency of the distributed application component model, software modules can be deployed in a distributed way. Thus, the required functions and services needed in a complex system do not all need to reside in the same code or even on the same hardware components.

The invention achieves its modularity through a superclass design that enforces consistency. Desirably, all objects in the system inherit their properties from the superclass.

The superclass has a number of features that allow the system to achieve the above objectives. The superclass defines a property called views that enables user interface devices (person machine interface devices) to display information about the object. In the building automation industry this is not as trivial as it might seem, for there is rarely much uniformity in the types of person machine interface devices found in the field, and the software engineer cannot assume that the device will have any knowledge of a particular object's display requirements.

The superclass also defines a commands property that tells what operations a particular object is able to perform. Again, in the building automation industry, the software engineer cannot assume that the hardware and software systems in the field will have any understanding of what operations a given object may perform.

Thus the superclass object architecture defines a self-descriptive, metadata definition; and perhaps more importantly, a mechanism by which these metadata are communicated to other components of the system. In effect, the superclass object specification, from which all application components are derived by inheritance, carries with it the mechanism needed for other system components (and other application objects) to view an object's data and exercise an object's commands.

Figure 1:
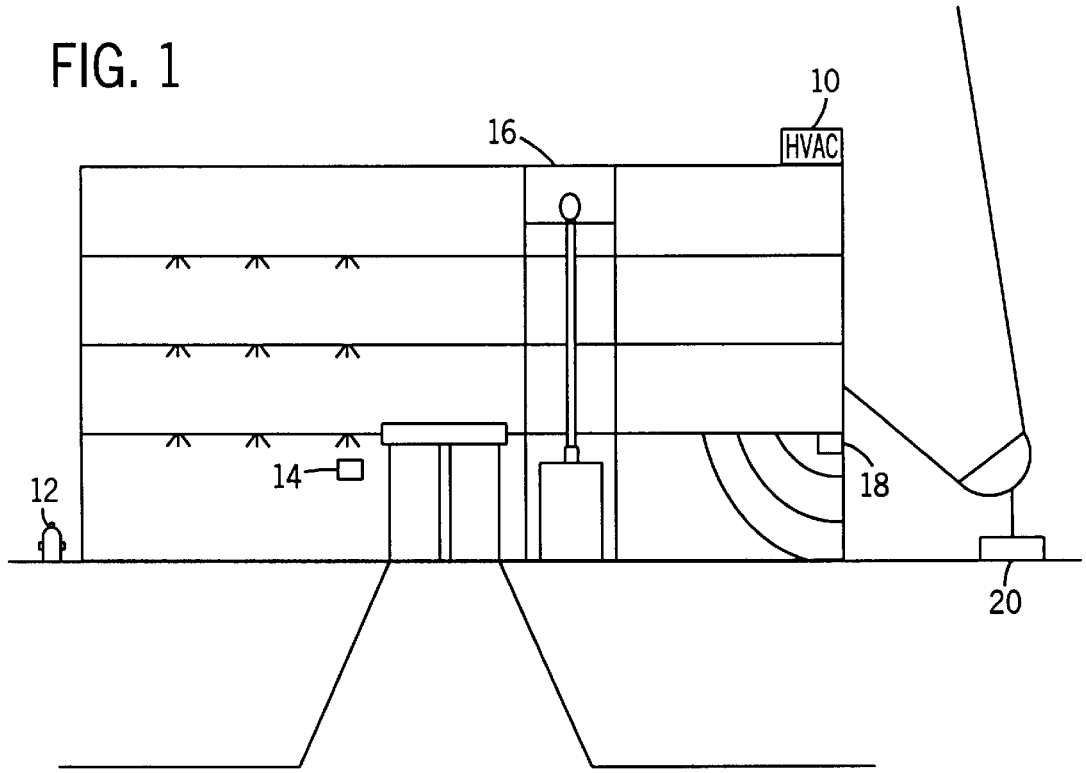
FIG. 1 is a view of a building environment, illustrating the building automation system of the invention in an exemplary application.
Figure 1:
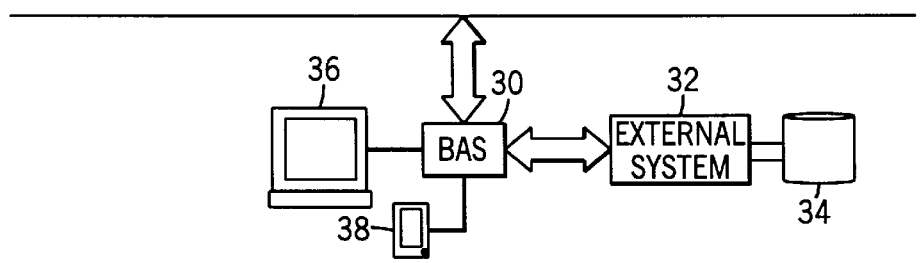

The building automation system of the invention provides a computer hardware and software architecture that supports powerful object-oriented control. The building automation system can be used to monitor, collect data and control a multitude of different facilities management devices and applications. By way of illustration, FIG. 1 shows an exemplary facilities management application within a building that includes a heating and cooling system 10, fire alarms and sprinkler system 12, security system 14, elevator control system 16, intrusion alert system 18 and lighting control system 20. Although not explicitly illustrated, the exemplary facilities management application may also include such other building system services as sewer and water, waste management, landscape irrigation and maintenance, parking lot and sidewalk maintenance, and physical plant inventory control.

The building automation system 30 of the invention is designed to electronically communicate with the aforementioned building systems, either by direct hardwire connection or through wireless communication; or, by accessing information stored in data files maintained by other systems within the facility. As an example of the latter, the building might have an existing heating and air-conditioning (HVAC) system that must be integrated into the system of the present invention. Such an external system, illustrated at 32, can be readily connected to the building automated system 30 through the third party interface provided by the building automated system 30.

The external system 32 may include its own information storage component such as database 34. In addition, the building automation system 30 of the invention maintains several data stores and provides the data migration capability to obtain and store information originally found in database 34 by communicating with external system 32.

The building automation system 30 also provides an Information Layer interface through which the human operator can interact with the building automation system through a variety of different user interfaces, including a generic browser. To illustrate some of the possible interfaces, a monitor 36 and a personal digital assistant (PDA) 38 have been illustrated. These user interface devices can be connected to the building automation system by wire, wireless communication, local area network (LAN), wide area network (WAN), or through some other suitable communication lengths such as a telephone connection or the Internet.

Figure 2:
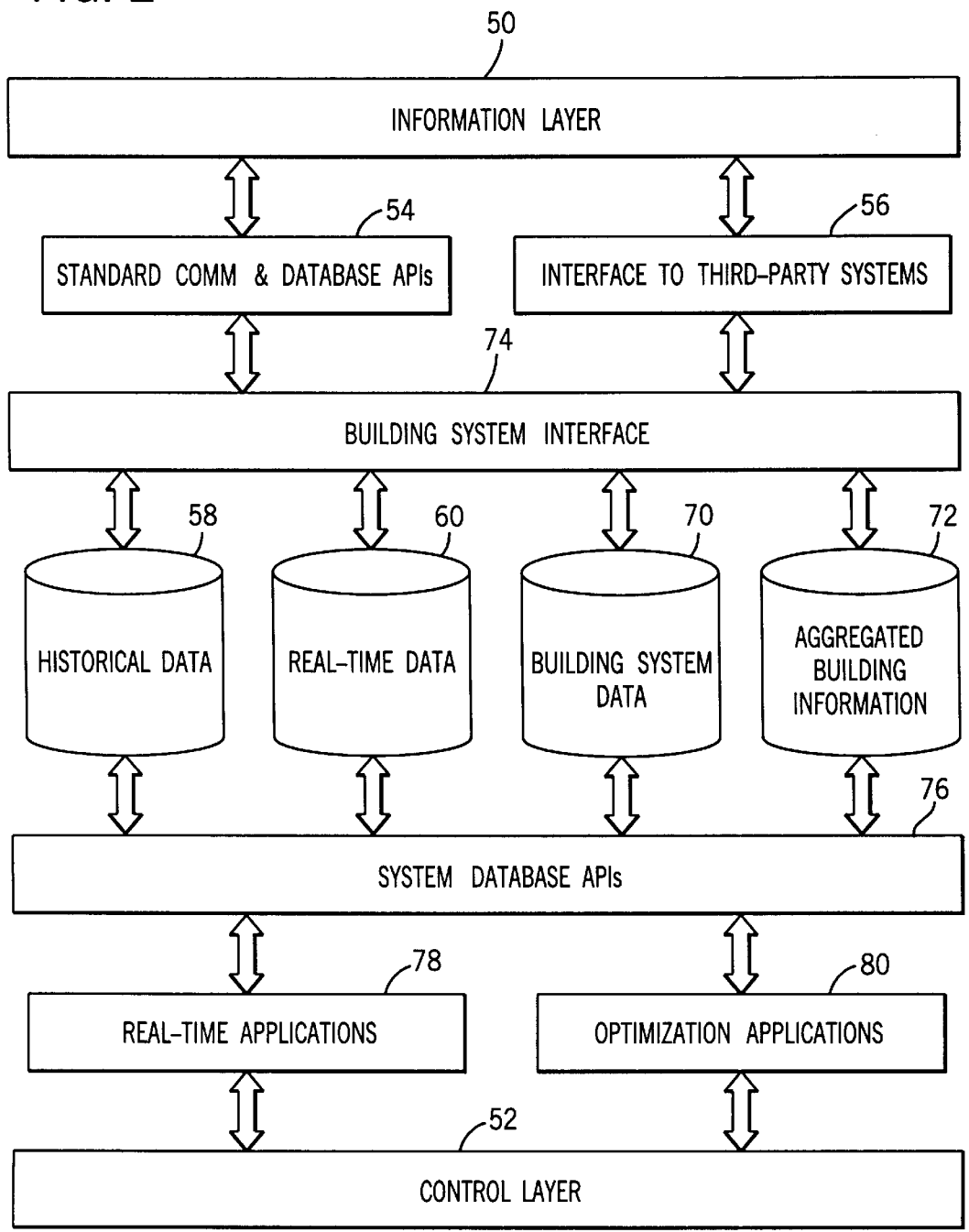
FIG. 2 is a block diagram of the building automation system architecture.

The building automation system 30 consists of various decoupled components that interact to form the system. These components include both hardware devices and software applications. FIG. 2 shows the presently preferred building automation system architecture. The architecture separates the information layer 50 from the control layer 52. The information layer is primarily responsible for supporting user interface devices and for running applications designed for user interaction. Such applications include system configuration and monitoring applications, hand held personal computer commissioning and troubleshooting applications, as well as local control device display applications. The control layer 52 is primarily for supporting various control devices (e.g., temperature sensors, thermostats, valves and dampers, compressors, and the like) as well as applications defined for interaction with such devices. Examples of control layer applications include intelligent sensors, room control applications, central plant controllers and associated optimization applications, unitary controllers and zone control applications.

Separating the information layer 50 from the control layer 52 provides a significant benefit. It severs the user interface functionality from the control device functionality, allowing the two to be revised or upgraded independently. Quite typically the user interface components of a building automation system change frequently, whereas the basic control device interfaces and control algorithms will remain largely unchanged for many years. Traditional building automation systems have not taken this evolution into account. Conventional building automation system software closely integrates control functions with user interface functions, requiring the control functions to be re-coded each time the user interface functionality evolves.

The building automation system architecture of the present invention provides two interfaces through which other systems may be coupled to the building automation system. The external system 32 (FIG. 1) is an example of such another system. The presently preferred embodiment recognizes that some external systems may be written to conform to the application programming interfaces (API) standards of the building automation system; whereas other systems may not conform to those standards. Thus the invention provides a standard communication and database API layer 54 through which conforming external systems can be coupled to the building automation system. A separate interface to other third-party systems is provided at 56 to allow non-conforming external systems to be coupled to the building automation system 30. This third-party interface 56 may include, for example, the necessary protocol converters and data migration tools to allow a third-party system to be operatively attached to the building automation system of the invention.

The building automation system maintains a variety of different data stores to allow the system to generate a wide variety of different informational reports. The data stores include historical data store 58, real-time data store 60, building system data store 70 and aggregated building information data store 72. The historical data store 58 maintains a long-term record of system operational performance for various building systems. The database engine associated with this data store is designed to allow flexible query and data analysis.

Real-time data store 60 stores current building system data. It includes a high performance data engine that will retrieve data on demand by the user. Preferably the real-time data store is configured as a memory cache that allow real-time data to be provided to the user quickly, in keeping with the user's expectation that real-time data should be displayed instantly.

The building system data store records system configuration data for various building systems. This data store includes an interface engine that efficiently and flexibly manages data from these various building system sources. A unique naming server is implemented in the building system data store to facilitate the aggregation of data from various sources. The naming server details are discussed more fully below.

The aggregated building information store 72 gathers data from various buildings or building systems. It is primarily used for generating summary and exception (error) reports.

As illustrated in FIG. 2, the data stores are architecturally positioned between the building system interface layer 74 and the system database API layer 76. These layers 74 and 76 function as communication engines, routing information among the various other layers within the architecture. The building system interface layer 74 communicates data from various building systems, including environmental, lighting, fire, security, power management, inventory and maintenance. The system data base API layer 76 accesses and populates the data stores. The preferred building automation architecture also includes an application layer that is preferably subdivided into the real-time applications layer 78 and the optimization applications layer 80. The real-time applications layer comprises one or more applications that periodically or continuously execute to automatically manage the operation of the facility according to the current settings of the systems operating attributes (stored in the building system data store 70). The optimization applications layer 80 comprises applications that periodically or continuously execute to automatically adjust the systems operating attributes to achieve improved system performance. The optimization applications layer updates the attributes stored in the building system data store 70.

Object Naming Server

The invention implements an object naming scheme that allows distributed objects to be located anywhere across the network. The naming scheme provides an application-based name, called the functional name, that allows the system developer (using a suitable application development tool) to assign names to objects from the application viewpoint. The naming server allows names to be organized into groups, allowing all objects of a specific type to be listed by name. If desired, certain objects can be assigned predefined names and these names are placed in dictionaries which are translatable into different languages, allowing the system to be deployed worldwide.

In general, objects can be referenced in a variety of ways. One is through a temporary reference that occurs when one user interface device views an object located elsewhere on the system. Objects can also be referenced by other objects. Such references are typically more permanent because they typically last as long as the object making the reference is in existence. To support these ways of referencing an object, the object naming server allows an object to be named using a functional name assigned to the object or using a composite of the object name of a container that holds the object, including the functional names of any nested containers involved in holding that object. Functional names may be assigned by the user and are typically selected to suggest the object's function. For example, a ceiling fan used to exhaust air from a room might be given the functional name, Exhaust_Fan.

Objects that are named only with a functional name can be accessed only by the container of that object. To permit an object to be referenced outside of its container, a separate object name may be assigned to the object. The object name includes a full hierarchial description of where the object is located. For example, if the exhaust fan described above happens to be located on the first floor of the building within a smoke control application, the object name for the exhaust fan might be: Floor1.Smoke Cntrl.

The name server provides a fast mechanism for locating objects by name and for performing queries on portions of the object name (using wildcards, for example). The name server can be deployed as a device on the system, simply by giving that device a local copy of some or all of the object names used on the system site, as well as information describing where those objects are bound or located. All devices on a site may be given knowledge of which devices have been designated as name servers. Thus such devices would request one of these name servers to locate an object so that it can be referenced or communicated with.

When an object is moved from one device to another its object name is not affected. Any objects that have referenced the object in its old location (and are thus currently bound to it) will receive an error the next time they send a message to that object. The system automatically attempts to rebind with the object that was moved, using the same query mechanism that is normally used when a device is first installed on the system. Once an object name is found elsewhere on the site, the new binding information for the new location is used thereafter.

The naming server system will not attempt to prevent the deletion of an object that may be referenced by other objects. Rather, a supervisory service is provided that maintains a record of all references to an object, so that a more knowledgeable decision can be made by the person seeking to delete the object.

Common Object Architecture

Figure 3:
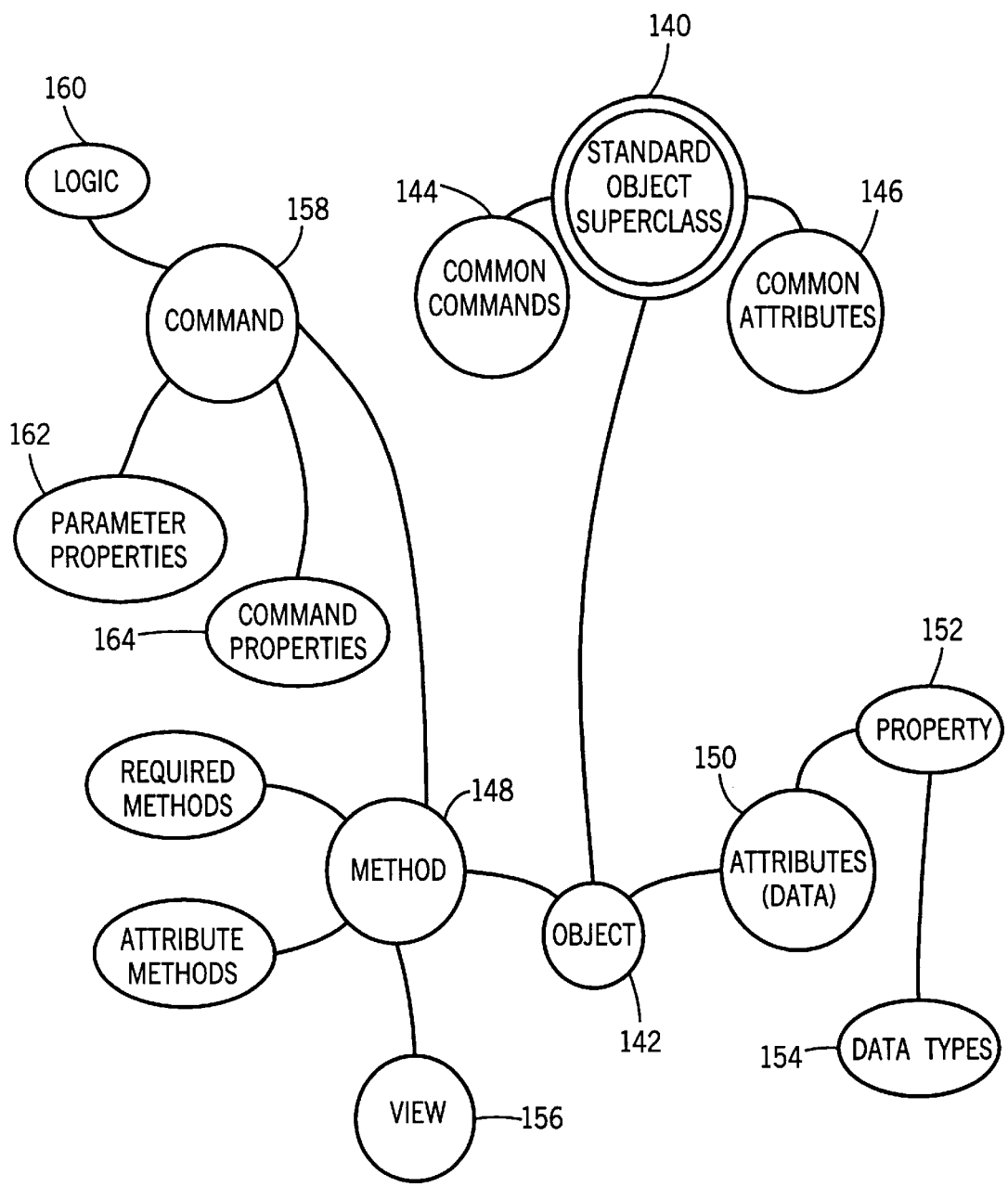
FIG. 3 is a common object model diagram illustrating the preferred superclass design employed by the building automation system.

FIG. 3 shows the class hierarchy illustrating various aspects of the standard object. Specifically, FIG. 3 is a class diagram according to the application framework of the invention. The actual standard object as distributed on a controller would be an instance of the object class as illustrated in FIG. 3.

The presently preferred embodiment defines a standard object superclass 140 from which each standard object 142 is derived. The standard object superclass defines a plurality of common commands 144 and a plurality of common attributes 146. In object-oriented parlance, the common commands are methods that the standard object is capable of performing and the common attributes are data that the standard objects are capable of storing. In other words, all standard objects include common commands 144 and common attributes 146, by virtue of inheritance from superclass 140.

In addition to the common commands and common attributes, a standard object may also have additional methods 148 and attributes 150 that correspond to object-specific details. Attributes, themselves, are defined according to a predefined hierarchy. Specifically, attributes are defined in terms of a set of properties 152 that are used to describe how the attribute is defined and to specify other characteristics about the attribute. One of these characteristics is the attribute's data type 154. By defining attributes in terms of a set of stored properties, the application framework gains considerable flexibility. For example, the data type of an attribute, or some other property, could be changed without the need to rewrite all other aspects of the attribute. This flexibility would, for example, facilitate changing a date field data type from a two-digit year to a four-digit year capable of handling both 1900 millennium and 2000 millennium dates.

The methods 148 provided by each object include two important components: a view component 156 and a command component 158. The view component stores methods that are specifically defined to display different sets of predefined attributes in different predefined ways. The view component encapsulates the logic needed to display certain information on the person-machine interface so that this aspect of providing information to the user does not have to be specifically programmed into the user interface. The view component allows applications written from the application framework to display information through generic browsers that do not need to be programmed ahead of time with specific knowledge on how to display the attributes being stored by the object.

The command component provides a somewhat related function with respect to certain methods of the standard object that are available for execution through the user interface. Commands represent a subset of the available methods defined in an object. Commands are methods that are visible to outside objects, and to the user interface, so that they can be executed by another object or from the user interface by sending a message to the object. The command component encapsulates the logic 160 performed by these externally visible methods. The commands are also defined in terms of parameter properties 162 and command properties 164. Similar to the attribute properties 152, these parameter properties 162 and command properties 164 are used to define the available commands so that they can be flexibly changed in developing different standard objects in the application framework.

Common Object Views

As noted above, when applications change it is often the user interface portion that needs to be rewritten; many physical system-dependent aspects remain fixed. Conventional device-dependent building automation systems have not recognized or exploited this fact. The architecture of the present invention separates much of the user interface "presentation" from the underlying physical control functions. This is accomplished, in part, by embedding in the standard object those aspects of the building automation problem that are dependent on relatively stable physical laws and human comfort concerns.

To further decouple the user interface presentation or information layer from the more physical control layer, the architecture provides an attribute view mechanism that is defined in the view component of each standard object. Thus each standard object, and hence all objects constructed from standard objects, has the embedded ability to serve up its attributes for display. The view component of each object has access to all properties of the attribute that the user interface browser or other user display window needs in order to properly display the attribute value.

Thus, for example, an analog input object displaying temperature would be able to tell a generic browser that its value is a temperature value, that it is within normal operating limits, that it has a certain degree of precision, and even that it is in degrees Fahrenheit as opposed to degrees Centigrade. Effectively, the view component of the object handles all of the device-specific details, so that the user interface does not need to be specially written to properly display the object's values. Rather, the user interface can be a simple browser, equipped with only sufficient intelligence to know how to interrogate the object's view parameters and thereafter display the attribute value to the user.

The presently preferred embodiment handles the display of information, based on the view component of each object, according to predefined rules that dictate how the view information is presented to the user. Preferably, the architecture is designed to expand the view of an object as the user becomes increasingly interested in levels of detail. The presently preferred embodiment thus defines different standard views that are hierarchically related to one another. The presently preferred embodiment implements the following standard views:

Key—a display of the key attributes of the object. The value or values of an object are displayed in queries, through graphics, and the like.

Focus—an overview of the most important attributes of the object. The default is a list of key attributes, default attributes and common object focus attributes.

Snapshot—an extension of the Focus view showing all non-internal and common attributes.

Extended Snapshot—an extension of the Snapshot view that appends internal attributes to the Snapshot view.

Configuration—an overview of the configurable attributes of the object. The default is a list of the object's configurable attributes and the common configurable attributes.

Change Attribute—an extension of the snapshot view allowing the user to modify writable attributes.

Commands—an overview of the most important commands of the object. The default is a list of key attributes and the common commands.

Extended Commands—an extension of the commands' view, appending any remaining common commands and internal commands to the command view.

The presently preferred embodiment implements a system of view consistency rules as follows:

1. Order the attributes according to the user's frequency of viewing/modifying.

Order the attributes to allow for viewing of increasing detail (i.e., a more detailed view will not re-order the previous view but expand it).

For ranges, list the lower value attribute first (e.g., Low_ Limit, then High Limit).

For all views, display common focus attributes first.

2. Ensure object View consistency between similar objects.

Verify Key attribute consistency for Key View (e.g., summaries, dynamic graphics, etc.).

No underscores between words in a name (used in BASIC only).

Verify that all attributes needed at the OWS are in the Focus View.

All attributes with their Internal property set are in Extended views.

For Array attributes, the attribute name is followed by its element number(s) in parenthesis (e.g., Make Limit(1)= 90%, Mode(1,3)=True).

3. Ensure Configuration view consistency between similar objects.

In the default Configuration view, show common Configurable attributes and all class attributes with their Configurable property set.

Order the re-directed attributes according to the order of attribute properties in BASIC (e.g., Relinquish_Default, Units, Min_Value, Max_Value, Display_Precision, COV_Increment, etc.).

4. Ensure Focus view consistency between similar objects.

In the default Focus view, show common Focus attributes, attributes with their Key property set, and attributes with their Default property set.

Show the Reliability attribute last (before Internal attributes).

5. Ensure Snapshot view consistency between similar objects.

Show common Focus attributes.

Next, show the object's Focus attributes.

Next, show Configuration attributes in the order of the Configuration view (unless duplicated from the Focus view).

Next, show all non-internal attributes and remaining non-internal common attributes.

Show the Period and Purpose attributes last (before Internal attributes).

Show internal attributes in an Extended Snapshot view.

6. Ensure Command view consistency between similar objects.

Show the current values of the attributes associated with the possible commands.

For command pairs, list the negative command first (e.g., Disable, then Enable).

Use the term "Cancel" to discontinue an operation (e.g., Cancel Timer).

For commands to Multistate attributes, provide a command for each state and use the multistate strings for the command name (e.g., Occupied/Unoccupied).

For commands to Array attributes, the attribute name is followed by its element number in parenthesis (e.g., Output State(1)=On).

Because the view component is defined at the object level, the system can be used to view attributes ranging from individual attributes of individual objects to views of attributes found in assembly objects or application objects. In the case of an attribute associated with an individual object, the viewed information includes certain property information about the attribute. For example, the display of an attribute of the "single" data type includes its functional name, its value and the applicable units. The value of the attribute is then automatically displayed at the precision specified by the attribute's precision property.

Attributes associated with assembly objects and application objects can also be viewed. The default view of an application or assembly object is built up from the default views of that object and the views of any associated components. The system of the invention implements a nested approach that allows a user to penetrate into the details of an application as desired.

Views can also be used to facilitate attribute modification. The user can access a Change Attribute view associated with a given value. When the value is changed, the user is presented with the appropriate range information (e.g., men_value, max_value, max_length, array size, multistate strings). Changes to range values are handled in pairs to prevent validation errors in crossed limits (e.g., high_limit<low_limit).

As noted above, the presently preferred embodiment offers several standard views, each offering different levels of information to the user. The data structures for these views will next be presented below.

Views Data Structures

To illustrate how the views data structure may be implemented, consider the following example. The example corresponds to an analog input object. The Focus, Snapshot, and Configuration views are illustrated.

Focus View

The Focus view includes the common object Focus attributes in the Object group and the important attributes of the object in the Engineering Data group.

For consistency, follow the attribute groupings as show below.

| [Object Type] Object Focus |
|---|
| Object |
| Object Name |
| Description |
| Status |
| Enabled |
| Engineering Data |
| Present Value |
| Out Of Service |
| Reliability |

Note: Objects with any of the attributes listed above will include them in the order shown.

Snapshot View

The Snapshot view includes the Common Focus attributes in the Object group, the non-internal attributes of the object in the Engineering Data group, and the remaining non-internal attributes of the Common object in the Object Details group. The attributes in the Engineering Data group are ordered according to the Focus view, followed by the Configuration view, and then any remaining attributes.

For consistency, follow the attribute groupings as show below.

| [Object Type] Object Snapshot | |
|---|---|
| Object | |
| Object Name | |
| Description | |
| Status | |
| Enabled | |
| Engineering Data | Object Details |
| Present Value | Execution Priority |
| Out Of Service | Object Category |
| Reliability | Functional Name |
| Startup Value | Short Reference |
| Units | Full Reference |
| Min Value | Object Identifier // Internal |
| Max Value | Object Type // Internal |
| Display Precision | Device Name // Internal |
| CDV Increment | Reference Count // Internal |
| Slot | Instance Size // Internal |
| Offset | PMI Refresh // Internal |

-continued

| [Object Type] Object Snapshot | |
| --- | --- |
| // Other Attributes | Parent OID // Internal |
| Period | Version // Internal |

Note: Objects with any of the attributes listed above will include them in the order shown. The Extended view includes attributes with their Internal property set.

Configuration View

The Configuration view includes the Common Configurable attributes in the Object group and the Configurable attributes of the object in the Engineering Data group.

For consistency, follow the attribute groupings as show below.

| [Object Type] Object Configuration |
| --- |
| Object |
| Object Name |
| Description |
| Enabled |
| Execution Priority |
| Engineering Data |
| Startup Value |
| Units |
| Min Value |
| Max Value |
| Display Precision |
| COV Increment |
| Out Of Service |
| Setup |
| Slot |
| Offset |
| Period |

Note: Objects with any of the attributes listed above wil include them in the order shown. The Extended view includes attributes with their Internal property set.

Command View

To illustrate how the command data structure may be implemented, consider the following example. The example corresponds to an analog output object.

The Command view includes the Common Focus attributes in the Object group, the Key attributes of the object in the Engineering Data group, and the important commands of the object in the Modify group.

For consistency, follow the attribute groupings as show below.

| [Object Type] Object Commands | |
| --- | --- |
| Object | |
| Object Name | |
| Description | |
| Status | |
| Enabled | |
| Engineering Date | |
| Present Value | |
| Output \| Input | |
| Modify | Operation |
| Override | Out Of Service |
| Auto | In Service |
| Adjust | Disable |
| // Miscellaneous Commands | Enable |

-continued

| [Object Type] Object Commands | |
| --- | --- |
| Change Attribute | Execute // Internal |
| Release | Trigger // Internal |
| Release All | |

Note: Objects with any of the commands listed above will include them in the order shown. The Extended view includes commands with their Internal property set.

From the foregoing it will be seen that the present invention provides an object-oriented building automation system that allows complex building automation problems to be solved in an application-centric context.

Specifically, the invention provides a computer-implemented building automation operating system upon which complex building automation applications may be installed. The operating system inherently supports a distributed object model in which all standard objects, assembly objects and application objects are derived from a common object superclass.

While the invention has been described in its presently preferred form, it will be understood that the invention is capable of certain modification without departing from the spirit of the invention as set forth in the appended claims.

We claim:

1. A computer-implemented building automation operating system for supporting applications that interact with building automation devices, comprising:

a common object superclass stored in computer readable memory that defines a plurality of common objects through instantiation such that said common objects have attributes for storing data and have methods for processing stored data;

said common object superclass defining a commands structure that identifies at least one of said methods as being externally invocable;

said common object superclass further defining a views structure that defines at least one predetermined group of attributes organized according to how data stored in said attributes are used for user interaction;

said common objects defining an application that includes a control layer for interfacing with a building automation device comprising at least one of said common objects;

said common objects defining an information layer for user interaction comprising at least one of said common objects, said information layer providing an interface for user configuration of the system through interaction with said externally invocable methods defined by said commands structure and said predetermined group of attributes defined by said views structure.

2. The system of claim 1 wherein said commands structure further defining a command that supplies the identity of said externally invocable methods.

3. The system of claim 1 wherein said commands structures and views structures store information that defines at least one user interface context; and wherein said system further comprises a generic user interface entity in communication with said information layer that dynamically generates a specific user interface based on said interface context.

* * * * *